No. 664,279. Patented Dec. 18, 1900.
J. A. KRAMER.
HARNESS PAD FORMER.
(Application filed May 25, 1900.)
(No Model.)
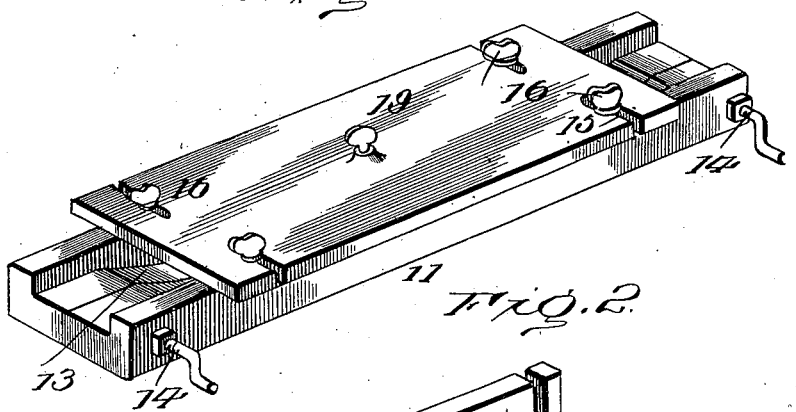
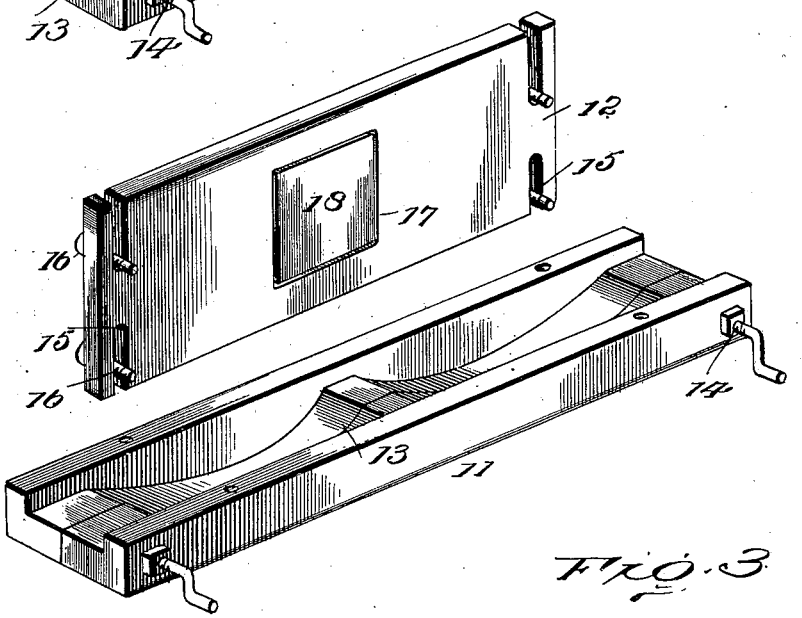
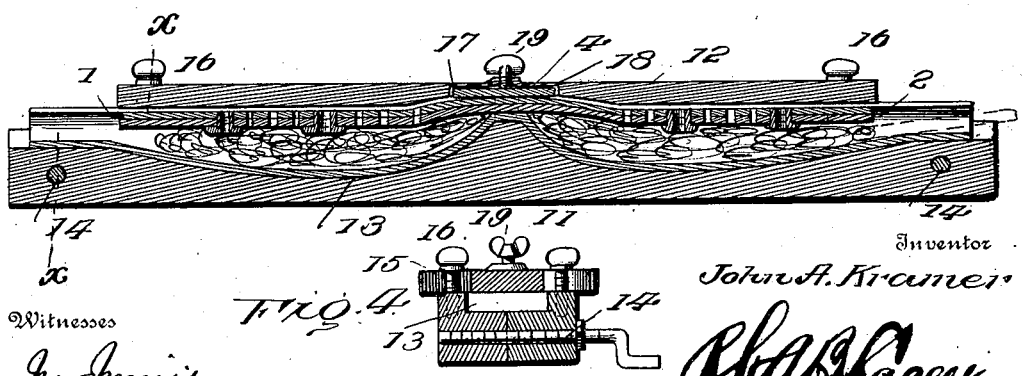
Witnesses
Inventor
John A. Kramer
By
Attorney
THE NORRIS PETERS CO., PHOTO-LITHO., WASHINGTON, D. C.

UNITED STATES PATENT OFFICE.

JOHN A. KRAMER, OF WINIGAN, MISSOURI.

HARNESS-PAD FORMER.

SPECIFICATION forming part of Letters Patent No. 664,279, dated December 18, 1900.

Application filed May 25, 1900. Serial No. 17,980. (No model.)

*To all whom it may concern:*

Be it known that I, JOHN A KRAMER, a citizen of the United States, residing at Winigan, in the county of Sullivan and State of Missouri, have invented certain new and useful Improvements in Harness-Pad Formers; and I do hereby declare the following to be a full, clear, and exact description of the invention, such as will enable others skilled in the art to which it appertains to make and use the same.

This invention has relation to means for confining covers or casings of padded parts of harness, such as the saddle, during the operation of stuffing or filling, whereby the prescribed shape is preserved and distortion obviated.

The invention consists, essentially, of a mold of novel formation and adjustable to allow for its use in connection with pads of different widths.

The invention further consists of the structural details and combinations of parts, which hereinafter will be more fully set forth, illustrated, and finally outlined in the appended claims.

Referring to the drawings, in which corresponding and like parts are indicated by the same reference characters in all the views, Figure 1 is a perspective view of a mold embodying the essential features of the invention. Fig. 2 is a similar view showing the cap plate or top turned aside. Fig. 3 is a central longitudinal section showing the manner of using the device. Fig. 4 is a transverse section.

The casing or cover of the pad is composed of the top or bur piece 1 of stout material and the lining 2, the two parts being secured at their longitudinal edges in any of the usual ways and transversely stitched at an intermediate point to form the neck 4. The lining 2 is pliable and of soft leather and shaped to the required form. The casing or cover when ready to be filled is placed in the mold, having its cavity of the shape conforming to the finished pad. This mold forms the vital feature of the invention and comprises the body 11, recessed in its top side to receive the cover or casing, and the top or cap plate 12, extending over the recess and holding the cover therein. The recess or mold-cavity 13 in the top side of the body 11 conforms to the lower or convex side of the pad, said recess being shallow at its ends and gradually deepening toward an intermediate point in conformity to the longitudinal outline of the pad when straightened out. The cover or casing is placed in the recess or mold-cavity 13, and the top or cap plate 12 is placed thereover and secured to the body 11, after which the process of stuffing is effected by means of forcing a suitable filling into the casing through the open ends thereof, the stuffing being packed to any desired degree. After the cover or casing has been stuffed the pad is removed from the mold, and the end portions of the lower part 2 of the cover are folded over the terminal portions of the part 1 and secured to the latter in the well-known manner. The pad is now complete and ready for use in connection with a saddle of any desired make.

In order that the mold may be used in connection with pads of different widths, it is divided longitudinally into sections, said sections being connected by transverse bolts 14 or like securing means. The top or cap plate 12 is made of a maximum width and is formed at its ends with transverse slots 15, through which thumb-screws or fastenings 16 pass to adjustably connect said cap-plate with the mold-body 11. The cap-plate has a depression 17 in its lower face midway of its ends to come opposite the central raised portion of the mold-cavity 13 to receive the middle portion of the pad when the latter is clamped between the upper and lower parts of the mold. A plate 18 is located in the depression 17, and a clamp-screw 19, having screw-thread connection with the plate 12, coöperates with the plate 18 to cause it to clamp the casing and prevent longitudinal displacement thereof during the stuffing process, the neck portion of the casing being clamped between the plate 18 and the raised portion of the mold-cavity. This construction makes provision for variation in thickness of different bur pieces or top parts of the cover.

The mold may be constructed of wood, metal, a combination of the two, or any material found most suitable for the purpose, and the recess will be an exact counterpart of the exterior configuration of the pad to be formed so as to preserve the shape thereof during the stuffing process.

Having thus described the invention, what is claimed as new is—

1. In means for forming harness-pads, a mold comprising a body portion recessed to receive the pad-covering, a cap-plate for closing the top side of the recess and extending over the pad-covering to retain the latter in place during the process of stuffing, and a clamp disposed centrally of the mold to grip the neck portion of the pad-covering, substantially as set forth.

2. A mold comprising a body having a side recessed to form the mold-cavity, the latter having its central portion elevated, a cap-plate fitted over the recessed side of the mold and centrally depressed, and a clamp located in the depression of the cap-plate, substantially as described.

In testimony whereof I affix my signature in presence of two witnesses.

JOHN A. KRAMER. [L. S.]

Witnesses:
JAS. A. MOFFITT,
W. O. WESTFALL.